US011258856B2

(12) United States Patent
O'Sullivan et al.

(10) Patent No.: US 11,258,856 B2
(45) Date of Patent: *Feb. 22, 2022

(54) IN-FLIGHT COMPUTING DEVICE FOR AIRCRAFT CABIN CREW

(71) Applicant: SITA Information Networking Computing Ireland Limited, Letterkenny (IE)

(72) Inventors: Kevin Dennis O'Sullivan, Hove (GB); Rowan George McDonald Shedden, North Sydney (AU); Stephane Cheikh, Crozet (FR)

(73) Assignee: SITA INFORMATION NETWORKING COMPUTER IRELAND LIMITED, Windyhall (IE)

( * ) Notice: Subject to any disclaimer, the term of this patent is extended or adjusted under 35 U.S.C. 154(b) by 217 days.

This patent is subject to a terminal disclaimer.

(21) Appl. No.: 16/436,451

(22) Filed: Jun. 10, 2019

(65) Prior Publication Data

US 2020/0068020 A1   Feb. 27, 2020

Related U.S. Application Data

(63) Continuation of application No. 13/850,082, filed on Mar. 25, 2013, now Pat. No. 10,320,908.

(51) Int. Cl.
*H04L 29/08* (2006.01)
*H04L 67/12* (2022.01)
(Continued)

(52) U.S. Cl.
CPC ............ *H04L 67/12* (2013.01); *G06Q 10/107* (2013.01); *G06Q 50/01* (2013.01); *G06Q 50/30* (2013.01)

(58) Field of Classification Search
CPC .............................. G06Q 50/00; G06Q 50/30
See application file for complete search history.

(56) References Cited

U.S. PATENT DOCUMENTS

| 6,760,778 B1 * | 7/2004 | Nelson ............... H04B 7/18506 |
| | | 709/246 |
| 2004/0106404 A1 * | 6/2004 | Gould ...................... G06F 8/65 |
| | | 455/431 |

(Continued)

FOREIGN PATENT DOCUMENTS

WO   2002103931 A1   12/2002

OTHER PUBLICATIONS

Examination Report issued in Indian Application No. 935/MUM/2014.

*Primary Examiner* — Esther B. Henderson
(74) *Attorney, Agent, or Firm* — Morris, Manning & Martin, LLP; Daniel E. Sineway; Adam J. Thompson

(57) ABSTRACT

The disclosed system can be used by cabin crew on-board an aircraft. At a location remote from the aircraft, a server can include a database. The server can selectively communicate with systems external to the server and external to the aircraft to retrieve information related to a flight to be made by the aircraft. The server can run an application for communicating with the external systems to send and receive data to and from the server. The external systems can include a source of baggage information. The server can be configured to transmit the passenger related baggage status information to the portable computing device for storage in the portable computing device database. The portable computing device can be on-board the aircraft. The portable computing device can have a portable storage device database for receipt and storage of flight related information received from the server during the flight.

12 Claims, 15 Drawing Sheets

(51) Int. Cl.
  *G06Q 10/10* (2012.01)
  *G06Q 50/00* (2012.01)
  *G06Q 50/30* (2012.01)

(56) References Cited

U.S. PATENT DOCUMENTS

| | | | |
|---|---|---|---|
| 2007/0027589 A1* | 2/2007 | Brinkley | G08G 5/0013 |
| | | | 701/3 |
| 2010/0121938 A1 | 5/2010 | Saugnac | |
| 2011/0028178 A1* | 2/2011 | Brady, Jr | H04W 4/42 |
| | | | 455/517 |

* cited by examiner

IN-FLIGHT COMPUTING DEVICE FOR AIRCRAFT CABIN CREW

CROSS REFERENCE TO RELATED APPLICATIONS

This application is a continuation of U.S. Pat. No. 10,320,908, filed Mar. 25, 2013, and entitled "IN-FLIGHT COMPUTING DEVICE FOR AIRCRAFT CABIN CREW," the entirety of which is incorporated herein by reference.

FIELD OF THE INVENTION

This invention relates to an in-flight computing device for aircraft cabin crew. It also relates to the acquisition and dissemination of journey related data such as flight data. It is particularly concerned with such data as is collected and utilised by cabin crew rather than flight deck crew.

BACKGROUND TO THE INVENTION

At present documentation related to a commercial flight is stored in a mixture of formats. Documentation such as crew manuals and other information that might be required by the flight crew in the cockpit is stored by a portable device such as a laptop or a tablet device and is available to the flight crew, typically in a format such as portable document format (pdf). However, there remains a large amount of paperwork that must be completed by the cabin crew before, during and after the flight. Once the flight has landed, this paperwork is dispatched, typically to a data processing centre in India, where the forms are processed and returned. The returned documentation may include flight reports and reports of safety incidents and information related to specific passengers, for example. This approach to landing flight and post-flight data is very cumbersome and slow and makes it difficult for airlines to react promptly to cabin service related issues and there is a need for an improved system and method for landing this type of passenger related flight data.

SUMMARY OF THE INVENTION

A first aspect of the invention resides in a system for use by cabin crew on board an aircraft. The system includes, at a location remote from the aircraft, a server including a database, the server selectively communicating with a plurality of systems external to the system to retrieve information related to a journey to be made by the aircraft, the server running an application for communicating with the external systems to send and receive data to and from the server. A portable computing device is provided on board the aircraft. The portable computing device has a database for receipt and storage of flight related information received from the server, the flight related information including seating information and other passenger related information. The portable device runs an application for real-time communication with the server during a flight for exchange with the server of at least one of seating and passenger related information during the flight.

Preferably, the portable computing device is a tablet computer.

The external systems may include one or more of the following:
a source of seat maps for the flight wherein the server stores the seats maps in the database and is configured to transmit the seat maps to the portable computing device for storage in the portable storage device database;
a source of a passenger name list for the flight wherein the server stores the passenger name list in the database and is configured to transmit the passenger name list to the portable computing device for storage in the portable storage device database;
a flight reservation system wherein the server stores flight information from the reservation system in the database and is configured to transmit the flight reservation information to the portable computing device for storage in the portable storage device database;
a source of airline loyalty information wherein the server stores passenger loyalty related information in the database and is configured to transmit the passenger loyalty information to the portable computing device for storage in the portable computing device database.
one or more social media websites wherein the server communicates with the social media website to obtain information related to passengers known to the system to have a profile on the website.
an email system for communication of data received by the server from the portable computing device during or after a flight.

The invention also resides in computerised method for cabin crew on board an aircraft. The method comprises receiving at a portable computing device on board the aircraft, flight related information from a remote server. the server is remote from the aircraft and includes a database. The server selectively communicates with a plurality of systems external to the system to retrieve information related to a journey to be made by the aircraft and stores the retrieved information in the database. The server runs an application for communicating with the external systems to send and receive data to and from the server and for communicating at least some of the stored retrieved information to the portable computing device, the flight related information received by the portable computing device including seating information and other passenger related information. The method further comprises storing the received flight related information at a database of the portable computing device. Flight related information is input into the database of the portable computing device during a flight in response to events occurring during the flight and the portable computing device communicates with the server during or after the flight to transmit the inputted flight related information from the portable communications device to the server.

Another aspect of the invention provides a portable computing device for use by cabin crew on board an aircraft, the device configured to: receive on board an aircraft, flight related information from a remote server, the server being remote from the aircraft and including a database, the server selectively communicating with a plurality of external systems to retrieve information related to a journey to be made by the aircraft and storing the retrieved information in the database, the server running an application for communicating with the external systems to send and receive data to and from the server and for communicating at least some of the stored retrieved information to the portable computing device, the flight related information received by the portable computing device including seating information and other passenger related information; store the received flight related information at a database of the portable computing device, receive inputs of flight related information into the database of the portable computing device during a flight in response to events occurring during the flight; and communicate with the server during or after the flight to transmit the inputted flight related information from the portable communications device to the server.

A further aspect of the invention provides a computer-readable medium storing a computer program, the computer program including instructions for causing a portable computing device to: receive on board an aircraft, flight related information from a remote server, the server being remote from the aircraft and including a database, the server selectively communicating with a plurality of external systems to retrieve information related to a journey to be made by the aircraft and storing the retrieved information in the database, the server running an application for communicating with the external systems to send and receive data to and from the server and for communicating at least some of the stored retrieved information to the portable computing device, the flight related information received by the portable computing device including seating information and other passenger related information; store the received flight related information at a database of the portable computing device receive inputs of flight related information into the database of the portable computing device during a flight in response to events occurring during the flight; and communicate with the server during or after the flight to transmit the inputted flight related information from the portable communications device to the server.

In any of the above aspects, the portable computing device may be a tablet computer.

In any of the above information, the flight related information may include one or more of a seat map, passenger name record items, the flight number, departure and arrival times, a passenger name list, frequent flyer profile information and social media profiles of passengers.

The above aspects of the invention may further comprise synchronising the server database and the portable computing device database.

The above aspects of the invention may further comprise inputting into the portable computing database, during the flight, data relating to faults identified by cabin crew during the flight, storing the data relating to faults and sending the data to the server during the flight.

In an embodiment of aspects of the invention the portable computing device may include a camera and the data relating to faults may include a photograph of an item identified as faulty. The item may be a passenger seat. The data sent to the server may be authorised by signature, for example by a senior crew member.

In an embodiment of aspects of the invention, the flight related information received from the server may include a delayed baggage report and associated passenger information, the method comprising inputting passenger contact data and/or baggage identification data into the portable computing device and sending the data to the server. The baggage identification data may include baggage colour and baggage style.

Embodiments of aspects of the invention may include inputting into the portable computing database, during the flight, data relating to complaints notified to cabin crew during the flight, storing the data relating to complaints, sending the data to the server during the flight, and receiving at the portable computing device, from the server, a response to the complaint during the flight.

Preferably, the portable computing device is configured to display a seat map including passenger related information for each seat.

Embodiments of the invention will now be described, by way of example only, and with reference to the accompanying drawings, in which:

FIG. 13 is a screen shot of a display of a crew tablet device showing an overview of the flight data relevant to the cabin crew;

FIG. 20 is a screen shot of a form for identifying a delayed bag by colour and style.

DESCRIPTION OF PREFERRED EMBODIMENT

Figure 1:
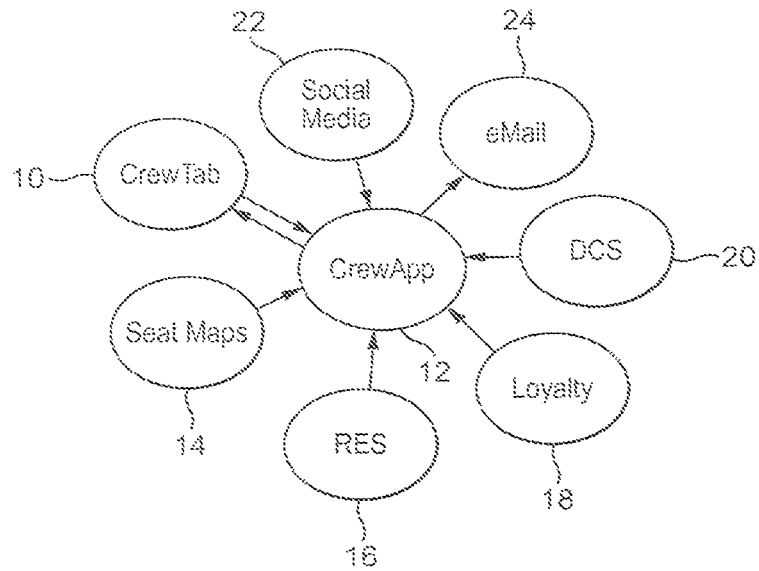
FIG. 1 is a schematic overview of the interactions between components embodying the invention and various external data sources.
Figure 2:
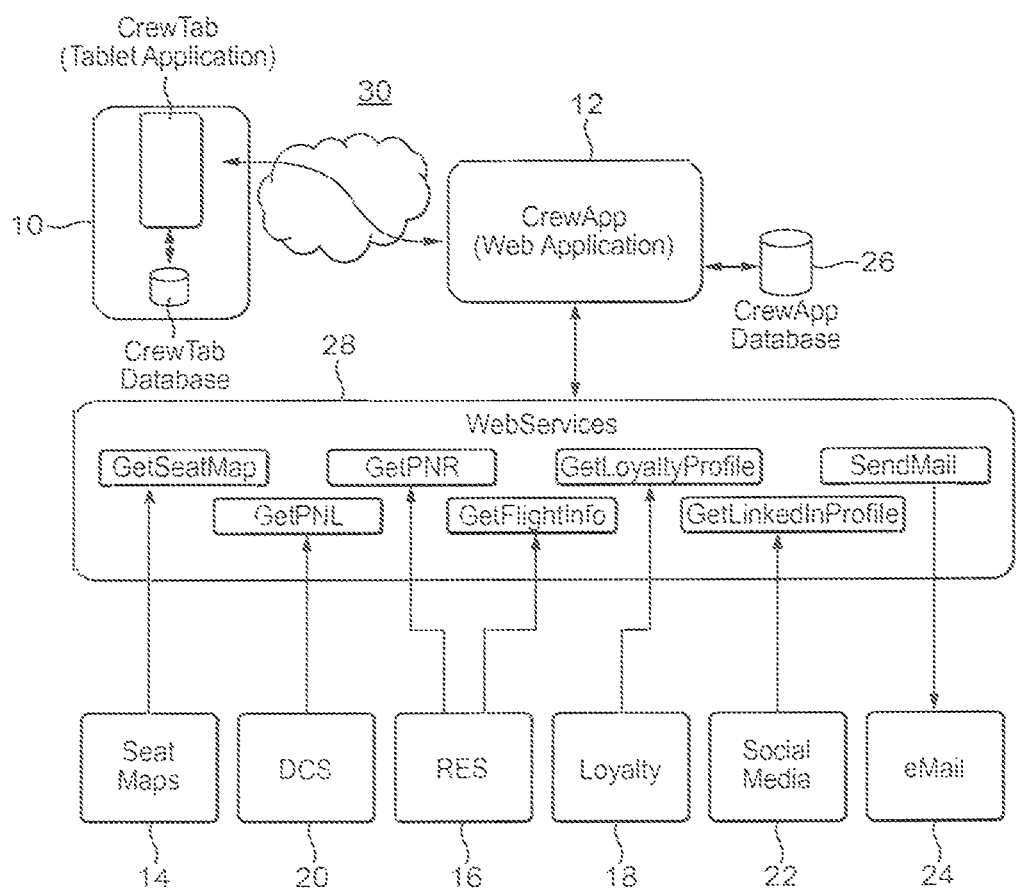
FIG. 2 illustrates the typical architecture of a system embodying the invention and operating in a pre-flight phase.

FIGS. 1 and 2 shows a schematic overview of the components of a system embodying the invention and the data source with which they exchange data, either by receipt or transmission of data or both.

The system comprises a portable computing apparatus 10 which may comprise a tablet computer or another suitable portable device such as, but not limited, to a smart phone or a laptop. In the following description the embodiment will be described in the context of a tablet device running an open source operating system such as Android developed by the Open Handset Alliance. Other operating systems may be used as preferred by the system provider. The tablet device runs a cabin crew software application features of which will be described and which is referred to hereafter as CrewTab. The term Cabin Crew Application merely refers to a software application running on the tablet which is suitable for use by, and intended for use by, one or more member of an aircraft cabin crew. Although the embodiment is described with respect to a simple tablet device, a plurality of tablet devices may be used with the number being dependent on the number of crew serving on the aircraft.

The tablet devices running the CrewTab Application communicate with a remote server running a web-based application 12 referred to hereafter as CrewApp. The tablet and CrewTab application provide a user interface permitting crew interaction with the system and the server running the CrewApp application providing interfaces with external components providing communication and data exchanges required with external information sources. Thus, in FIG. 1, data is exchanged bilaterally between CrewTab 10 and CrewApp 12. CrewApp 12 communicates to receive data from a source of seat map information 14, which is typically a computer or database controlled by the same airline, a flight reservation system 16, a passenger loyalty system 18, a departure control system 20, and one or more social media platforms 22 such as Facebook® or LinkedIn®. The CrewApp 12 can also send data via an email interface 24. Each of these external information sources comprises a computer or a database which stores information.

The operation of the system may be divided into three phases: pre-flight, in-flight and post-fight. Each of these will now be described.

Pre-Flight Phase

This phase is illustrated schematically in FIG. 2 in which the external data sources referred to with respect to FIG. 1 are referenced by the same numerals. During the pre-flight phase the system is initialised with data obtained by the CrewApp 12 from the external data sources via a web services interface 28. As the system is not required to have real time data access, an intermediary database 26 is provided to store data received from the external data sources before it is synchronised to the CrewTab application running on the tablet device. Thus, the database 26 is a part of the server side of the system and may be physically part of the server computer or cluster of server computers.

The pre-flight process may be initiated programmatically at a pre-determined time before flight departure, or manually from the tablet device via the CrewTab application. As seen in FIG. 2, the CrewApp application communicates with the remote data sources via a web service application 28 described below and with the CrewTab application 10 via a mobile communication or Wi-fi connection 30 to be described.

In-Flight Phase

During the flight phase, the CrewTab application may be disconnected from the CrewApp application and may involve only the tablet device which may be used only by the cabin crew manager, a designated person, or by multiple crew members if multiple devices are in use.

Figure 3:
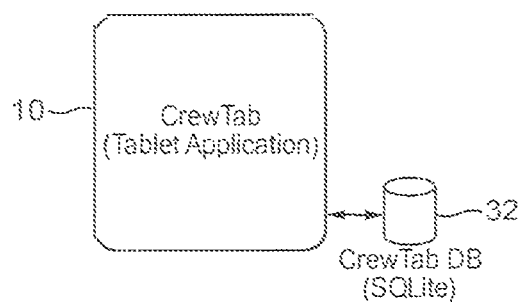
FIG. 3 shows, schematically, the in-flight phase.

The tablet device stores, in an on-board database 32 shown in FIG. 3, passenger information and seat displays which are available for use in-flight, as well as some or all of the forms that cabin crew must complete during a flight. The Tablet and CrewTab 12 also allows crew to enter notes on passengers or other items which notes call be processed after the flight.

Post-Flight Phase

Figure 4:
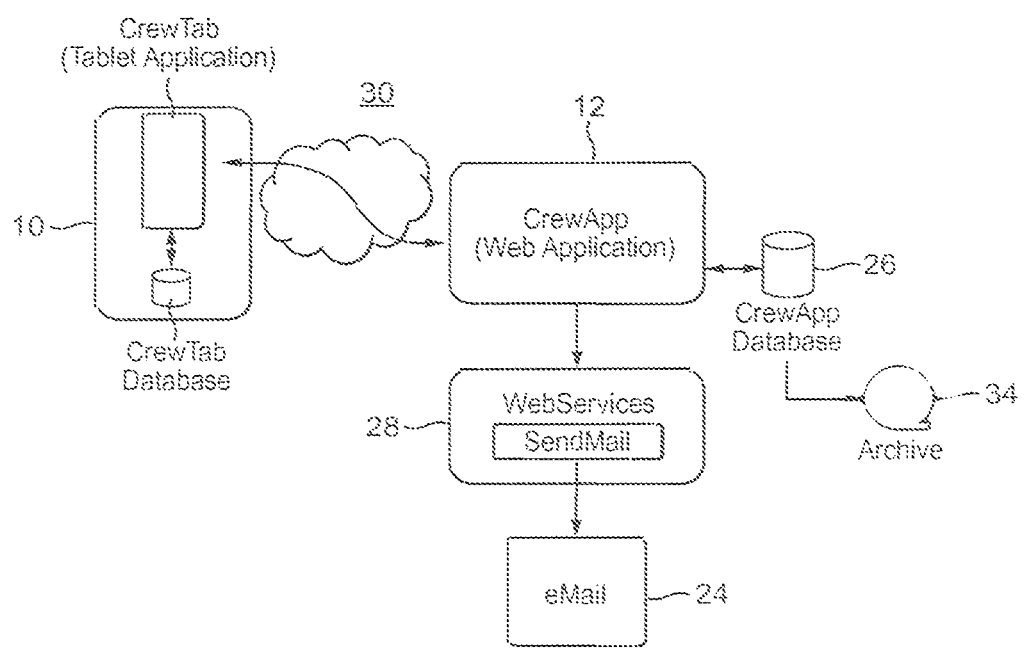
FIG. 4 shows; schematically, the post-flight phase.

During the post-flight phase passenger and other data gathered in-fight is transferred to a repository for subsequent interrogation. The completed forms are sent by email of other electronic communication to their intended destination. This phase is illustrated in FIG. 4 which shows how data is transferred from the tablet to the CrewApp application 12 from where it is transferred to an archive 34 via the CrewApp database 26.

Figure 5:
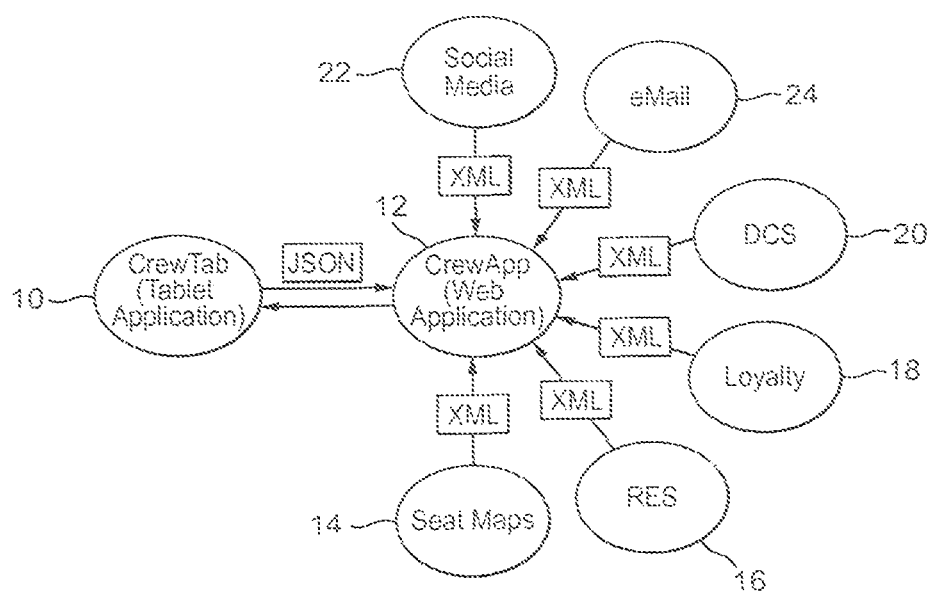
FIG. 5 shows one embodiment of data exchange formats that may be used between the components illustrated in FIG. 1.

FIG. 5 shows the data exchange formats which may be used, although other formats may be used if desired. As shown in FIG. 5, the data is exchanged with the external data sources in XML format whereas data is exchanged between CrewApp and CrewTab in JSON format. JSON (JavaScript Object Notation) is a lightweight data exchange format based on a subset of JavaScript Programming Language, Standard ECMA-262 $3^{rd}$ Edition.

The web services 28 (FIG. 2) may be implemented using the representational state transfer standard JSR-311 otherwise known as REST (REpresentational Store Transfer) web services or JAX-RS. The Jersey framework may be used as a reference implementation of JAX-RS to manipulate data elements.

The server may use Apache Tomcat as an open source web server, or any other suitable web server. The web server may implement the following web services illustrated in FIG. 2 to provide the necessary data for the system:

SyncCrewTab—this service synchronises the data from the CrewApp database 26 with the data in the CrewTab database. All data required for the CrewTab application is maintained in the CrewTab database 32 which is an SQlite database in this example.

SyncCrewTab—this service synchronises the data from the CrewTab database with that in the Crew App database.

GetSeatMap—this service communicates with the seat maps data source 14 to retrieve the seat map for the flight.

Get PNL—this service communicates with the DCS source 20 to retrieve the passenger name list from the departure control system.

Get Flight Info—this service obtains flight information including flight number, departure and arrival times from the reservation system 16

Get PNR—this service obtains the passenger name record items from the reservation system 16.

GetLoyaltyProfile—the service obtains frequent flyer profile information for the passengers on board the flight from a loyalty system 18 such as ePiphany®.

GetLinkedInProfile—this service obtains information from a social media site such as LinkedIn or Facebook for those passengers that can be uniquely identified with a known profile on that social media website.

SendMail—this service enables post-flight data to be emailed with attachments if required.

Still referring to FIG. 5, the system may use the following external systems. The following is purely exemplary and other providers may be chosen. The departure control system and the reservation system may be the Amadeus system provided by Amadeus IT Group SA. The loyalty program is airline or airline group specific and will be provided by the airline whose crew are using the system. The social media website may be any of a number of well known social media websites, for example, LinkedIn, Plaxo or Facebook. These websites are accessed through HTTP sessions.

In addition to these external systems, seat maps and CrewApp each comprise a set of database tables containing, respectively, the seat map inventory and the operational data required for the CrewTab application. Each may be accessed by a JDBC connection and SQL query.

The CrewTab tablet application may use any suitable operating system. Android @provided by Google Inc. is one presently preferred platform. Data transmitted to and from the CrewTab application may be in JSON (JavaScript Object Notation) format.

Figure 6:
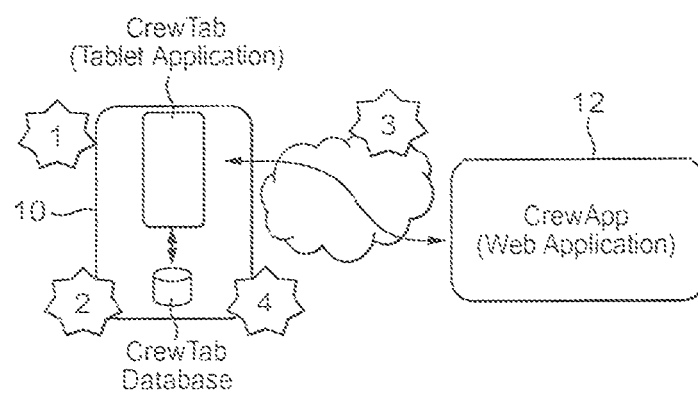
FIG. 6 illustrates a sequence of events in a pre-flight phase of operations.

Referring to FIG. 6, the pre-flight phase process will now be described.

The pre-flight phase begins when the Cabin Crew Manager or other personnel starts the application from the tablet User Interface (UI) or at a predetermined time based on the scheduled time of departure of flights. The CrewApp application starts a workflow that results in all data necessary for the application being gathered and loaded into the CrewApp database.

A CrewTab database houses the data required to satisfy the data prerequisites of the system. The database is a subset of the CrewApp database and is the source of data for the CrewTab application, including seat map information, passenger information and flight information.

In FIG. 6, the steps labelled 1 to 4 are as follows:
1. The CrewTab application is started by the cabin crew manager.
2. The CrewTab local database is prepared.
3. The CrewApp web service SyncCrewTab is invoked to initiate the flow of events required to populate the CrewTab database.
4. The CrewTab local database is synchronised with the CrewApp database and the data required for the pre-flight and in-flight phases is now available for use by other parts of the CrewTab application.

The in-flight phase may be an offline utilisation of the data gathered during the pre-flight phase. The Android tablet may be out of communication range once the fight has departed and is airborne; therefore, the only data source available is the local database.

The CrewTab application will be able to display seat map, passenger and flight information from the data present in the local database. The CrewTag UI allows presentation of this information in various formats e.g. as a seat map display, as a passenger info popup or as flight information populated onto the screen real estate.

In addition to displaying the seat, passenger and flight information and cabin crew manager or other operator, may enter data into forms made available through the CrewTab application. The forms are electronic representations of paper-based versions.

Figure 7:
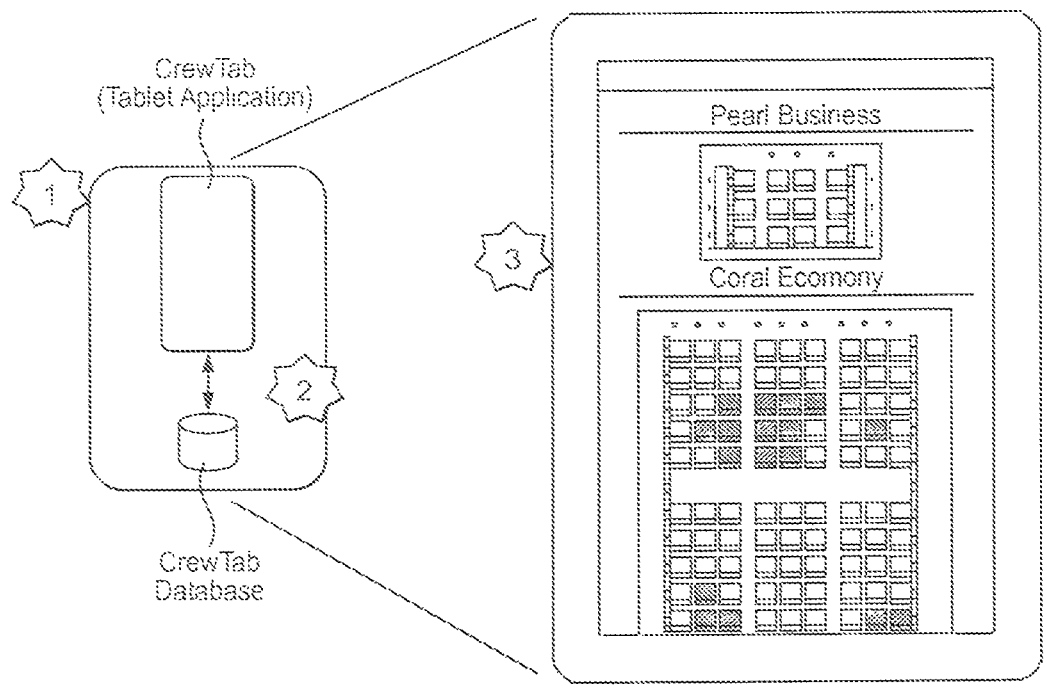
FIG. 7 shows a first type of passenger information that may be displayed on the handheld device in the in-flight phase of operation.

FIG. 7 shows a seat map and passenger display, the in-flight process including steps 1 to 3 as follows:
1. The CrewTab application is accessed.
2. The CrewTab application interrogates the local database to obtain data.
3. The CrewTab application displays the information.

Figure 8:
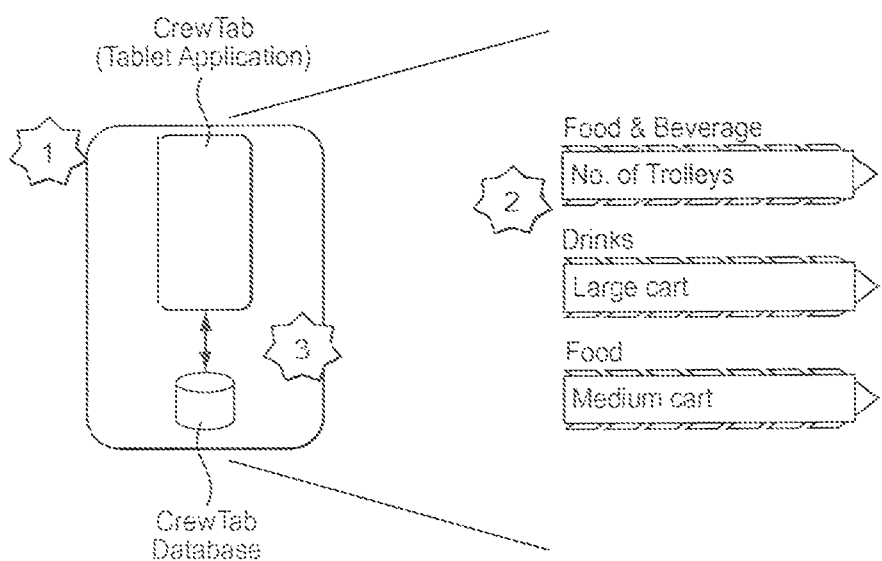
FIG. 8 shows form processing in the flight phase of operation.

FIG. 8 shows how the CrewTab application may be used for form processing. Again this involves three steps 1 to 3 as follows:
1. The CrewTab application is accessed.
2. A form is displayed and information is entered.
3. The form data is saved to the local database for subsequent processing.

In the post-flight phase the contents of the CrewTab tablet local database are synchronised with the CrewApp database for post-flight processing of data gathered in-flight. The cabin crew manager or other user starts this procedure by selecting an option on the CrewTab UI. Or this process can be triggered automatically when the Android tablet detects an internet connection and gets back online.

The CrewTab application sends data to the CrewApp application using the SyncCrewTab web service with indicators set to identify this as the post-flight phase.

Figure 9:
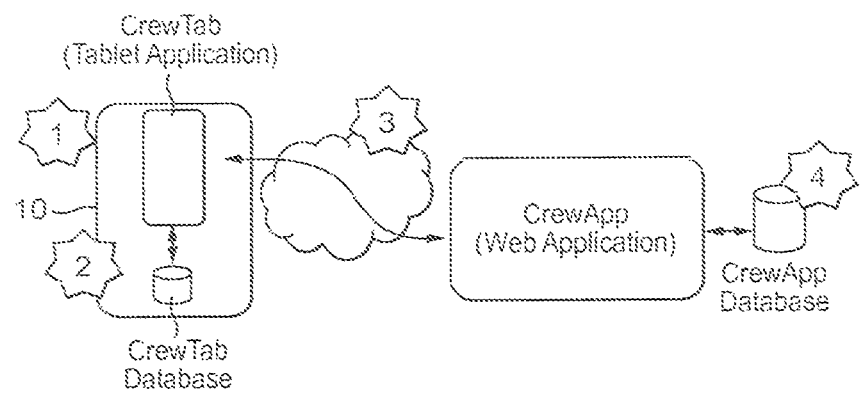
FIG. 9 shows how the completed forms of FIG. 8 are handled in the post-flight phase of operation.

Any forms which have been completed are emailed to specific destination for subsequent processing. This process is shown as steps 1 to 4 in FIG. 9 as follows:

1. The CrewTab post-flight option is selected by the cabin crew manager.
2. The CrewTab local database is read and data is formatted for transmission.
3. The CrewApp web service SyncCrewTab is invoked to receive the data.
4. The CrewApp database is populated with post-flight information.

CrewApp Web Application

The CrewApp web application provides a REST web service interface for interaction with the CrewTab application. Data transmitted between the CrewApp and CrewTab applications may be in JSON format, whilst data exchange between the CrewApp and other web services may be in XML. REST type web services provide the interface to the data source systems and the Jersey implementation of JAX-RS may be used for data manipulation.

Pre-Flight Phase

In the pre-flight phase the data required for the application is aggregated and delivered to the CrewTab application. The CrewApp application is invoked by the receipt of a request for the SyncCrewTab web service.

The CrewApp co-ordinates the gathering of information from the disparate data sources and stores the results in the database. When all necessary data is obtained and contained in the database the CrewApp sends the data to the CrewTab application for use in the next phases of application.

The information includes the following although this information is exemplary only; other information may be gathered and same or all of the information listed below may not be included:

Seat map information—sourced from a database of seat maps and tail numbers, being a unique identifier of the aircraft to which the seat relates.

Passenger information—sourced from departure control, reservations, loyalty and social media systems.

Flight information—sourced from the reservations system.

Baggage Information—sourced from SITA Worldtracer and/or SITA Bag Journey

Figure 10:
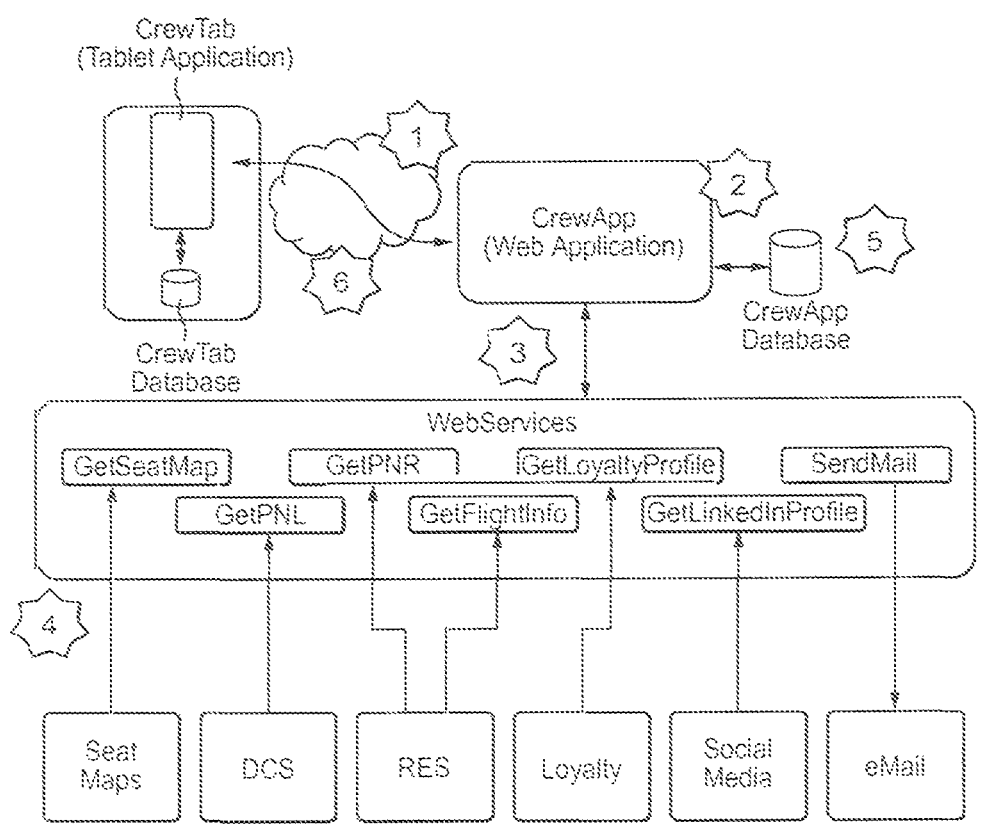
FIG. 10 is a similar view to FIG. 2 showing the sequence of events in the pre-flight phase.

The process flow is shown in FIG. 10, in which the numbered steps are as follows:
1. The CrewApp application is invoked by receipt of a request for the SyncCrewTab web service, or pre-determined trigger based on flight departure time.
2. The CrewApp database tables are prepared for the flight.
3. The CrewApp application invokes a series of web services to obtain the data necessary for the CrewTab application.
4. The data sources are interrogated and return requested data for the flight.
5. The CrewApp database is updated with the obtained data.
6. The CrewTab application receives data as a response to the SyncCrewTab web service request.

In-Flight Phase

During the flight, the CrewApp can communicate with the CrewTab application if the CrewTab is being used on a 'connected flight'. A connected flight is a flight where there is an Internet connection available.

Post-Flight Phase

The post-flight phase is initiated by the receipt of a request for the SyncCrewTab web service with indicators set to identify the post-flight phase.

Data is received as part of the web service request and is written on the CrewApp database. The data is passenger information and complete forms which have been gathered by the CrewData application in-flight phase.

The forms will be emailed or otherwise transmitted to a configured email address for human workflow processes and the passenger data will be archived thus leaving it available for processing by other systems.

Figure 11:
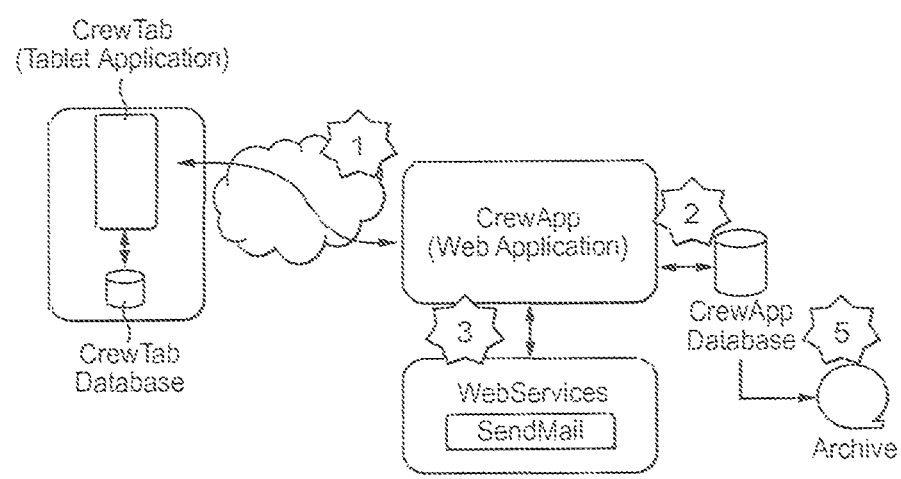
FIG. 11 is a similar view of FIG. 4 showing the sequence of events in the post-flight phase.

FIG. 11 shows depicts the post-flight flow of events.

The process steps are as follows:
1. The CrewTab post-flight action is initiated by the cabin crew manager or other designated person.
2. The CrewApp database is updated with the data gathered in-flight. This data includes updated passenger information and completed forms.
3. An email or other electronic communication with a completed form attached, is sent to a designated email address using the Send/Mail web service.
4. The email is delivered.
5. The CrewApp database is archived.

Figure 12:
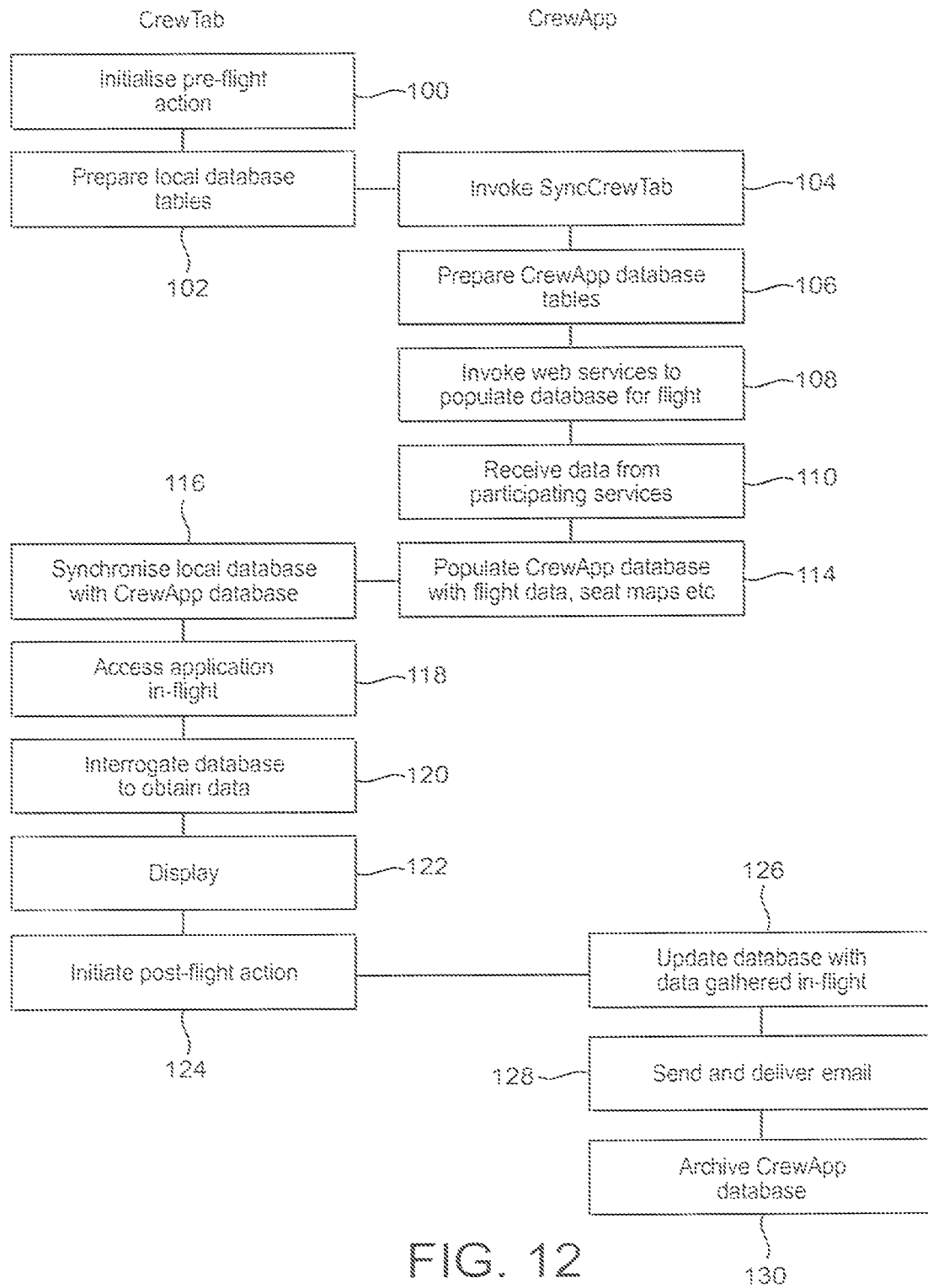
FIG. 12 is an end-to-end process view of the pre-flight, in-flight and post-flight phases.

FIG. 12 is a flow chart that shows the complete end-end process flow that has been described above.

At step 100, the CrewTab application pre-flight action is initiated by the cabin crew manager. The CrewTab local database tables are prepared at step 102 and the CrewApp web service SyncCrewTab is invoked at step 104 to initiate the flow of events required to populate the CrewApp database. At step 106, the CrewApp database tables are prepared for the flight and at step 108 the CrewApp invokes web services to obtain the data necessary to populate the CrewApp database for the flight. The workflow and event processing is managed by the CrewApp application. Data parsing, transformation and aggregation is handled in this step.

Participating systems such as those shown in FIGS. 1 and 2 contribute data, via a web service interface, to the CrewApp application at step 110. The CrewApp database is populated at step 112 with flight data, seat maps and passenger information relevant to the flight and a response is sent to the CrewTab application at step 114. The CrewTab local database is synchronised with the CrewApp database at step 116 and the data required for the pre-flight and in-flight phases is now available locally at the tablet for use by other parts of the CrewTab application.

During a flight the CrewTab application is accessed at step 118 and interrogates the local database to obtain data at step 120. The CrewTab application displays the data retrieved from the database at step 122. The post-flight action is initiated by the cabin crew manager at step 124 and the CrewApp database is updated with the data gathered in-flight at step 128. An email, with a completed form attached, is sent using the SendMail web service and delivered to the recipient at step 128. Finally, the CrewApp database is archived and the information is available for use by other applications.

The embodiment described illustrates how flight related data may be provided to cabin crew and in-flight data may be stored and synchronised with a central database post-flight. Relevant flight related data may then be sent electronically as part of a required flight report.

Figure 13:
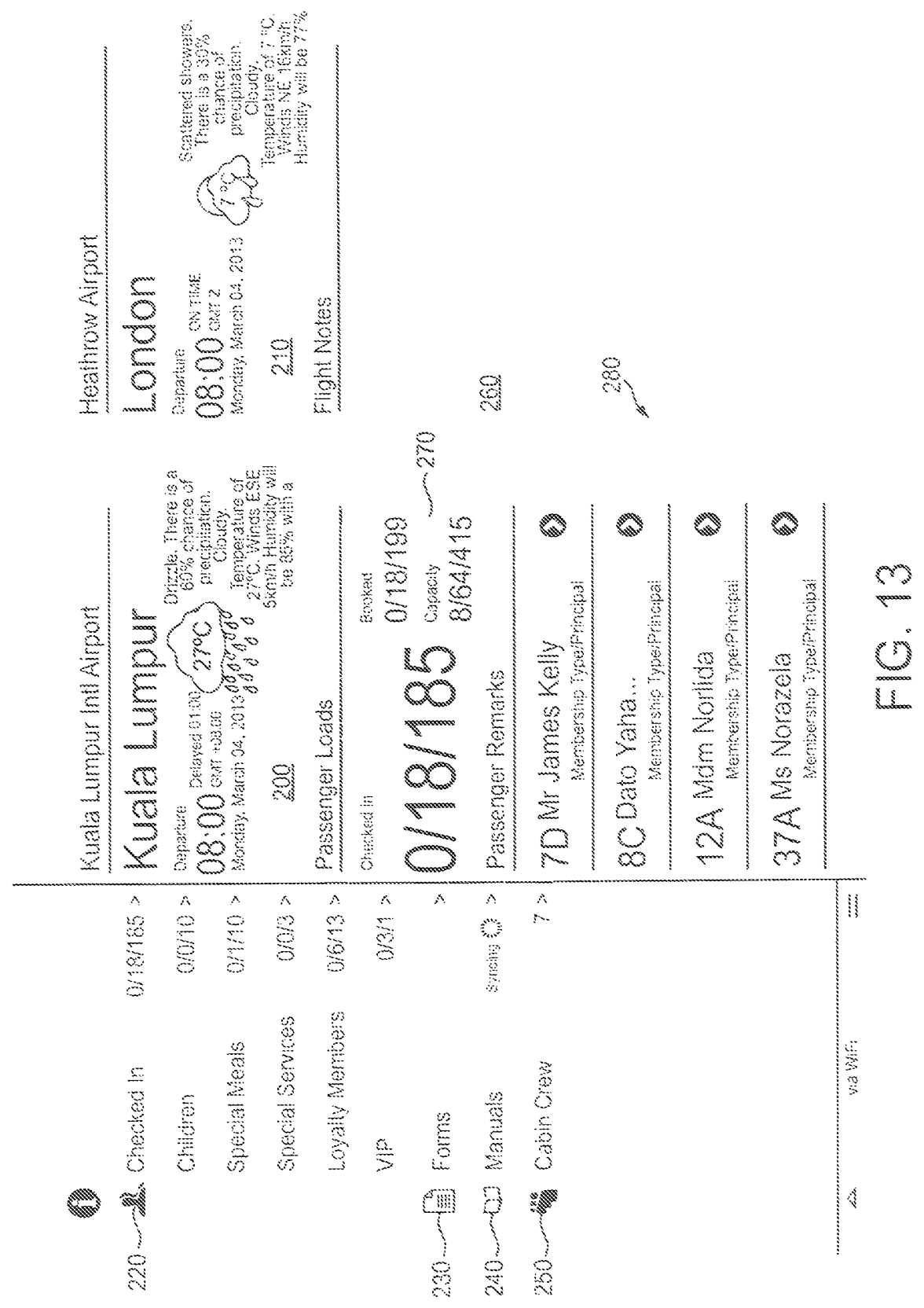
Figure 14:
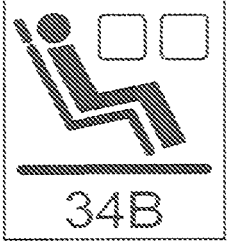
FIG. 14 is a screen shot of a seat fault report form which can be completed by the cabin crew via the crew tablet device.
Figure 15:
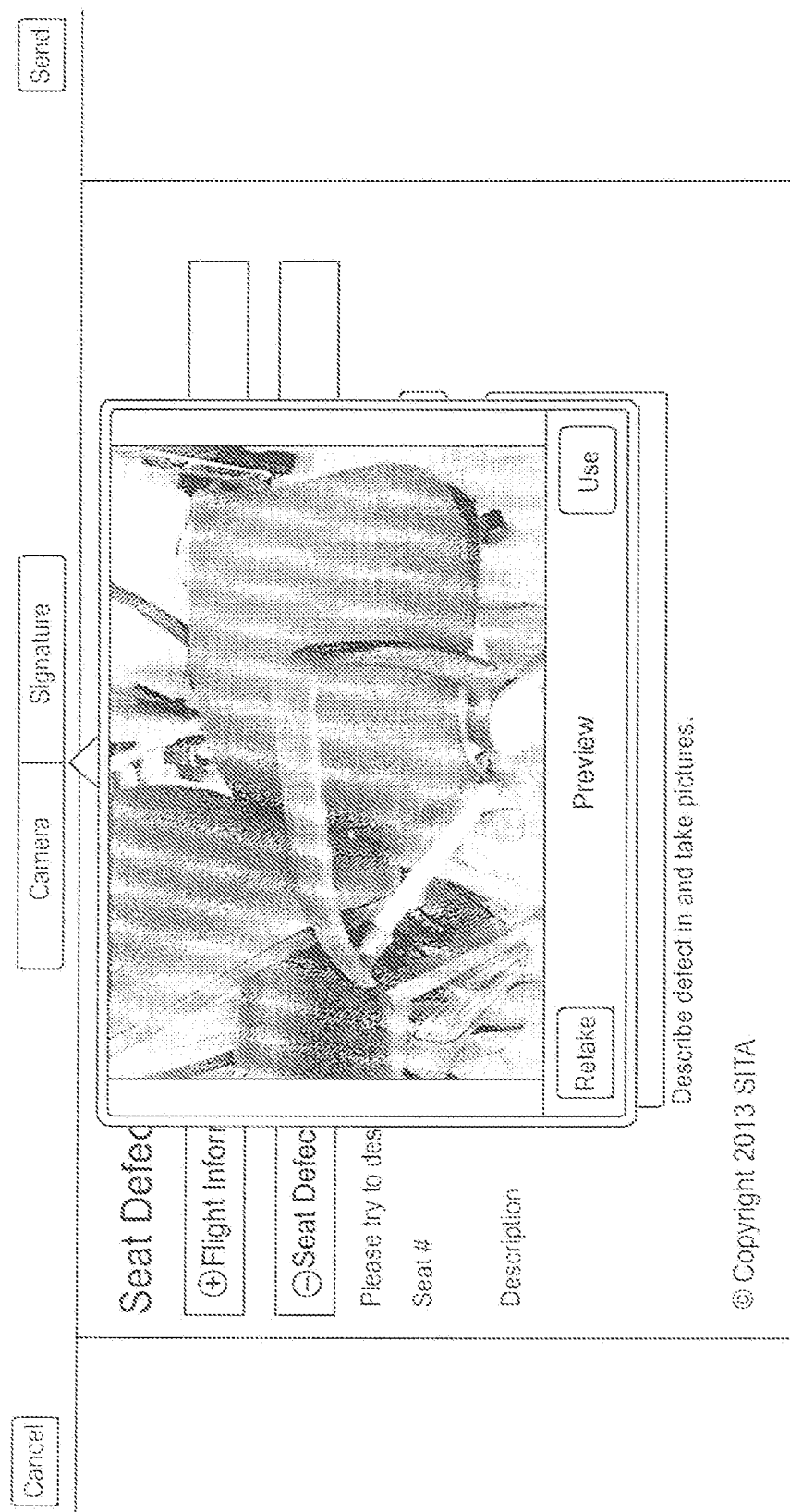
FIG. 15 is a screen shot of an alternative seat defect report include a photograph of the faulty seat.

FIGS. 13 to 15 show examples of the displays that the CrewTab application presents to the cabin crew user. FIG. 13 is a general overview screen which displays flight related information. This screen shot is taken during the flight and shows, at 200, 210 the origin and destination airports and their local weather conditions and the take-off and landing times. The flight is identified at the top of the screen together with the date and the aircraft type. In this case the flight is on 4 March, flight MH0004 from Kuala Lumpur to London Heathrow on an Airbus 380.

On the left hand side of the display is a series of menus. The first 220 and enables the crew member to view passengers who have checked in, children on board, special meals that have been ordered by passengers, special services that are required, for example assistance with disabled passengers, loyalty members who are on board and VIP members on board. Beneath that is a menu item 230 labelled forms which gives the crew member access to various forms that can be submitted during and after the flight and examples of which are described below.

Menu item 240 gives the crew access to various user manuals that would otherwise have to be stored as hard copies and menu item 250 gives access to information about other crew members on board.

The central panel displays details of the number of passengers that have checked into the flight and divides these between first, business and standard economy classes. In the example shown there are 0 passengers in first class, 18 in business class and 185 in economy class. Also displayed is the maximum capacity of the aircraft in this configuration: 8 first class seats, 64 business class and 415 economy seats.

Below the passenger loading information 270 is a listing of passengers 280 against whom remarks have been stored in the system and their seats. In this case four such passengers are shown but this number may vary and a scroll bar may be used if necessary. The main display indicate the general nature of the remark, as shown all passengers listed are senior loyalty members. Each passenger record can be accessed individually to obtain more information.

FIG. 13 is an overview screen. FIG. 14 shows a screen which may be used for fault reporting. The cabin crew member uses this screen to enter data during the flight or shortly after landing. The data is then transferred back to the CrewApp application as described previously. Thus FIG. 14 also shows flight details and progress but is specific to a selected seat, in this case seat 34B. The crew member can input a measure of the urgency of the problem in panel 300, here shown as between one and five stars and a description of the problem in text panel 310. In this case the problem is shown as a broken video screen. A check box 320 is provided which indicates whether the passenger was compensated for the problem and a further text panel 330 is provided for the cabin crew to enter the nature of the compensation, if any. In this case the customer is shown as having been compensated with 100 'enrich miles'. On selecting the 'submit' button 340 the data input by the cabin crew member is stored in the tablet's CrewTab database ready to be transferred to the CrewApp database on landing.

Figure 16:
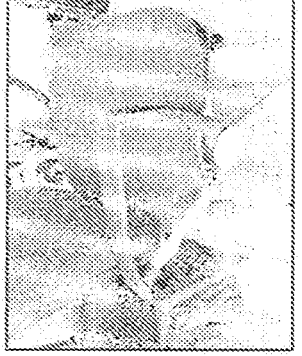
FIG. 16 illustrates how a seat defect report may be authorised by signature.

FIG. 15 shows an alternative fault reporting screen. In this case the tablet includes a camera and the cabin crew member uses the camera to take a photograph of the damaged seat to attach to the report. FIG. 15 show a preview screen which the crew member can inspect to assess whether it identifies the damage adequately and, if necessary retake the photo. FIG. 16 shows how the damage report may be authorised by an appropriate signature on board, in the case of a tablet or other device with a touch sensitive display. In the case of a seat fault report the authorisation will be from the captain or other designated senior personnel. However, a similar approach may be used to authenticate passenger complaint forms, in which case the passenger may sign.

Figure 17:
FIG. 17 shows the completed seat defect report with photograph and signature.

FIG. 17 shows the completed form which identifies the seat, the damage suffered and attaches a photograph of the damage and an automation. This may be then sent by the CrewTab application when the flight lands or, as described below, during the flight.

Figure 18:
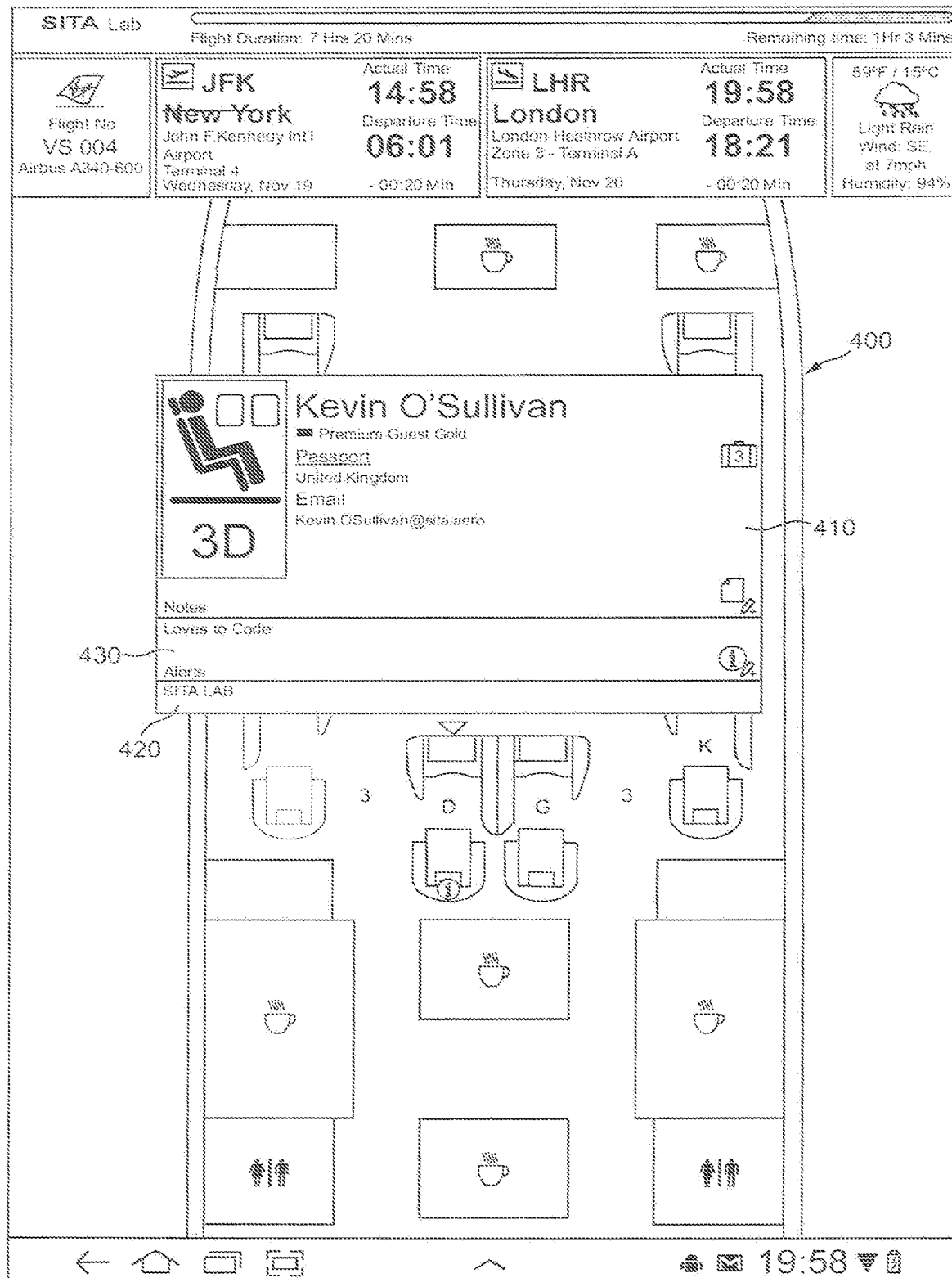
FIG. 18 is a third screen shot showing the seat map of FIG. 15 overlaid by information related to a particular seat that has been selected by the user.

FIG. 18 shows a seat map 400 for the whole aircraft which the cabin crew member can scroll through and select individual seats using the particular methods and protocols specific to the tablet being used. In this instance seat 3D has been selected and information relating to the passenger assigned to that seat is displayed in a panel 410. This panel shows the name of the passenger his or her status with the airline's reward scheme, passport details and email addresses. It also shows the number of bags the passenger has checked in.

At the bottom of the panel is an alert area 420 which displays important information for example, special assistance or dietary requirements. Above is a notes area 430 into which the cabin crew can enter notes relating to the passenger.

The system described may also be used to handle passenger complaints. At present, if a passenger raises a complaint on board a flight, the cabin manager is required to fill out a complaint form. The complaint may be related to any aspect of the passenger's experience, such as the level of service, delays, cabin crew performance etc. The completed form is sent to the airline's head office when the plane returns to the head office airport and then sent to the customer service department who will consider the complaint and make the appropriate response, which may be an apology or some sort of compensation. This may take place several days after the flight and location of the passenger may not be straightforward. The customer service department may only hold sketchy details of the passenger, such as frequent flyer account details and the passenger may be travelling away from home when the complaint is handled.

Embodiments of the present invention enable the complaint to be logged in the CrewTab database as soon as it is received in-flight. The CrewTab contains all relevant data about the passenger and the complaint can be transferred electronically as soon as the flight lands. Upon receipt the customer services department can assess the complaint and communicate with the passenger in real time, before the passenger has left the airport. The complaint form may be accessed through the forms menu 230 and processed in a manner similar to that described for the seat defect report and be authenticated by the signature either of the passenger or a crew member, depending on the nature of the complaint.

In the embodiments described, the CrewTab application disconnects from the server and the CrewApp application during the in-flight phase. When the flight lands, the CrewTab reconnects and transfers data to CrewApp as described. In an alternative embodiment the CrewTab remains connected to CrewApp during the in-flight phase. This requires some kind of in flight internet access, for example Wi-Fi, to be available during the flight. This is already possible on some airlines and likely to become more common in the future. Thus, the complaint logging process described above could be transmitted in real time enabling a response to be received, from the airlines head office while a flight is still in progress, giving the passenger the satisfaction of having their complaint resolved while the flight is still in progress. Moreover, the seat damage report may be transmitted in flight so that engineers and ground staff at the destination airport are aware of the damage and can be ready to fix it in the turnaround time available for the flight. This is most advantageous as it allows damage to be fixed extremely quickly after detection and ensures that the inconvenience to a passenger is not carried over to future passengers using the same seat.

Figure 19:
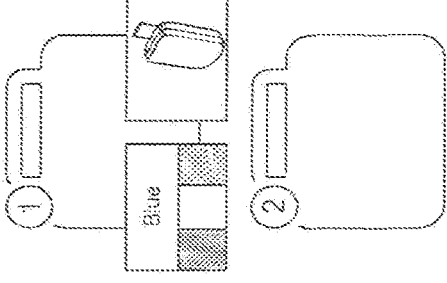
FIG. 19 is a screen shot of a delayed baggage report.
Figure 20:
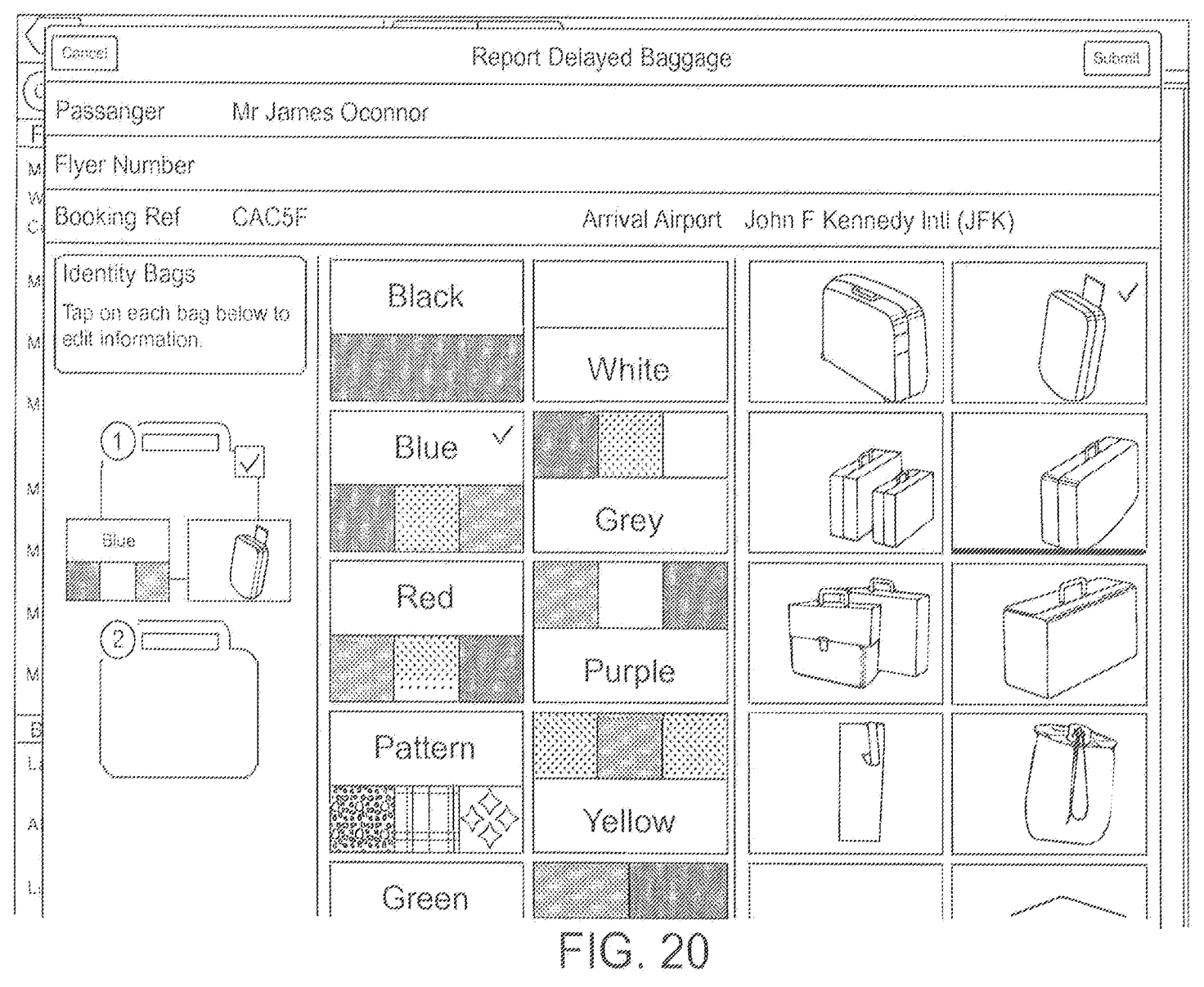

In a further embodiment, on-line in-flight the system described may be used to aid baggage handling. As shown in FIG. 18, the panel 410 which identifies a customer by seat includes an icon indicating the number of checked bags. In the case of a passenger catching a connecting flight, it is possible to use the system to notify the passenger of any baggage related delays that are anticipated and to enable remedial action to be taken to maximise the chance of a bag making a connecting flight. FIGS. 19 and 20 show a delayed baggage reporting process. In the case that a bag does not make it onto the flight, the origin airport will issue a delayed baggage report and the bags will typically be sent out on the next available flight. This report can be sent to the CrewTab application once the flight has closed and there is no longer a possibility of the bags making the flight. The CrewApp application can associate the baggage report with the passenger and send the associated baggage report to the CrewTab application. As has already been seen from FIG. 18, the CrewTab application already has details of the number of checked bags. The report delayed baggage form of FIG. 19 is populated with information about the passenger with whom the bags are associated. This population may be done automatically by the system if it has that information stored. Alternatively it can be input by the passenger at the request of a cabin crew member. Importantly this will include contact details for the passenger, such as address and phone number so that the bags can be delivered on arrival. To aid identification of the missing bags, FIG. 20 shows how identification details of the bags may be entered such as the colour and style of the bag, so aiding visual recognition of the bag when it arrives at the destination airport. In the example of FIG. 20 the first checked bag has been identified as blue upright design.

Various modifications to the embodiments described are possible and will occur to those skilled in the art without departing from the scope of the invention which is defined by the following claims.

The invention claimed is:

1. A system for use by cabin crew on-board an aircraft, comprising:
   at a location remote from the aircraft, a server including a database, the server selectively communicating with a plurality of systems external to the server and external to the aircraft to retrieve information related to a flight to be made by the aircraft, the server running an application for communicating with the external systems to send and receive data to and from the server, wherein the external systems include a source of baggage information and the server stores passenger related baggage status information in the database and is configured to transmit the passenger related baggage status information to a portable computing device for storage in a portable computing device database; and
   the portable computing device on-board the aircraft, the portable computing device having a portable storage device database for receipt and storage of flight related information received from the server during the flight, wherein at least a portion of the flight related information originates from the plurality of external systems, the flight related information including passenger related baggage status information, the portable computing device running an application for real-time communication directly with the server during the flight via a WiFi connection for a two-way exchange between the server and the portable computing device of passenger related baggage status information during the flight.

2. The system according to claim 1, wherein the portable computing device is a tablet computer.

3. The system according to claim 1, wherein the external systems include a source of seat maps for the flight and the server stores the seats maps in the database and is configured to transmit the seat maps to the portable computing device for storage in the portable storage device database.

4. The system according to claim 3, wherein the external systems include a flight reservation system and the server stores flight information from the reservation system in the database and is configured to transmit the flight reservation information to the portable computing device for storage in the portable storage device database.

5. The system according to claim 4, wherein the external systems include a source of airline loyalty information and the server stores passenger loyalty related information in the database and is configured to transmit the passenger loyalty information to the portable computing device for storage in the portable computing device database.

6. The system according to claim 1, wherein the external systems include one or more social media websites and the server communicates with the social media website to obtain information related to passengers known to the system to have a profile on the website.

7. The system according to claim 1, wherein the external systems include an email system for communication of data received by the server from the portable computing device during or after the flight.

8. A computerized method for cabin crew on-board an aircraft, comprising:
receiving at a portable computing device on-board the aircraft during a flight, flight related information from a remote server, wherein at least a portion of the flight related information originates from a plurality of systems external to the server and external to the aircraft, the server being remote from the aircraft and including a database, the server selectively communicating with the plurality of systems external to the server and external to the aircraft to retrieve information related to the flight to be made by the aircraft and to store the retrieved information in the database, the server running an application for communicating with the external systems to send and receive data to and from the server and for communicating at least some of the stored retrieved information to the portable computing device, the external systems including a source of baggage information, the flight related information received by the portable computing device including passenger related baggage status information and other passenger related information;
storing the received flight related information including passenger related baggage status information at a local database of the portable computing device; and
exchanging information directly with the server via a WiFi connection during the flight to transmit the inputted flight related information including the passenger related baggage status information between the portable communications device and the server.

9. A portable computing device for use by cabin crew on-board an aircraft, the device configured to:
receive on-board an aircraft during a flight, flight related information from a remote server, wherein at least a portion of the flight related information originates from a plurality of external systems, the server being remote from the aircraft and including a database, the server selectively communicating with the plurality of external systems to retrieve information related to the flight to be made by the aircraft and storing the retrieved information in the database, the server running an application for communicating with the external systems to send and receive data to and from the server and for communicating at least some of the stored retrieved information to the portable computing device, the external systems including a source of baggage information, the flight related information received by the portable computing device including passenger related baggage status information and other passenger related information;
store the received flight related information including passenger related baggage status information at a local database of the portable computing device;
receive inputs of flight related information including passenger related baggage status information into the local database of the portable computing device during the flight in response to events occurring during the flight; and
exchange information directly with the server during the flight via a WiFi connection to transmit the inputted flight related information including passenger related baggage status information between the portable communications device and the server, wherein the plurality of external systems are external to the server and external to the aircraft.

10. A system for use by cabin crew on-board an aircraft, comprising:
at a location remote from the aircraft, a server including a database, the server selectively communicating with a plurality of systems external to the server and external to the aircraft to retrieve information related to a flight to be made by the aircraft, the server running an application for communicating with the external systems to send and receive data to and from the server, wherein the external systems include a source of flight related information including a source of aircraft information and a source of maintenance information and the server stores passenger flight related information including aircraft and maintenance information in the database and is configured to transmit the flight related information including aircraft and maintenance information to a portable computing device for storage in a portable computing device database; and
the portable computing device on-board the aircraft, the portable computing device having a portable storage device database for receipt and storage of flight related information including aircraft and maintenance information received from the server during the flight, wherein at least a portion of the flight related information including aircraft and maintenance information originates from the plurality of external systems, the portable device running an application for real-time communication directly with the server during the flight via a WiFi connection for a two-way exchange between the server and the portable device of flight related information including aircraft information and maintenance information during the flight.

11. A computerized method for cabin crew on-board an aircraft, comprising:
receiving at a portable computing device on-board the aircraft during a flight, flight related information from a remote server, wherein at least a portion of the flight related information originates from a plurality of systems external to the server and external to the aircraft, the server being remote from the aircraft and including a database, the server selectively communicating with the plurality of systems external to the server and external to the aircraft to retrieve information related to the flight to be made by the aircraft and to store the retrieved information in the database, the server running an application for communicating with the external systems to send and receive data to and from the server and for communicating at least some of the stored retrieved information to the portable computing device, the external systems including a source of flight related information including aircraft information and maintenance information, the flight related information received by the portable computing device including aircraft information and maintenance information;

storing the received flight related information including aircraft information and maintenance information at a local database of the portable computing device; and exchanging information directly with the server via a WiFi connection during the flight to transmit the inputted flight related information including the aircraft information and maintenance information between the portable communications device and the server.

12. A portable computing device for use by cabin crew on-board an aircraft, the device configured to:

receive on-board an aircraft during a flight, flight related information from a remote server, wherein at least a portion of the flight related information originates from a plurality of external systems, the server being remote from the aircraft and including a database, the server selectively communicating with the plurality of external systems to retrieve information related to the flight to be made by the aircraft and storing the retrieved information in the database, the server running an application for communicating with the external systems to send and receive data to and from the server and for communicating at least some of the stored retrieved information to the portable computing device, the flight related information received by the portable computing device including aircraft information and maintenance information;

store the received flight related information at a local database of the portable computing device;

receive inputs of flight related information into the local database of the portable computing device during the flight in response to events occurring during the flight; and exchange information directly with the server during the flight via a WiFi connection to transmit the inputted flight related information including aircraft information and maintenance information between the portable communications device and the server; wherein the plurality of external systems are external to the server and external to the aircraft.

* * * * *